United States Patent [19]

Abbin et al.

[11] Patent Number: 5,080,559
[45] Date of Patent: Jan. 14, 1992

[54] LIQUID METAL ELECTRIC PUMP

[75] Inventors: Joseph P. Abbin; Charles E. Andraka; Laurance L. Lukens; James B. Moreno, all of Albuquerque, N. Mex.

[73] Assignee: The United States of America as represented by the United States Department of Energy, Washington, D.C.

[21] Appl. No.: 469,855

[22] Filed: Jan. 23, 1990

[51] Int. Cl.⁵ ............................................. H02K 44/04
[52] U.S. Cl. .................................... 417/48; 417/50
[58] Field of Search ............... 417/48, 49, 50; 204/140, 422

[56] References Cited

U.S. PATENT DOCUMENTS

| | | | |
|---|---|---|---|
| 3,404,036 | 10/1968 | Kummer et al. | 429/50 |
| 3,591,312 | 7/1971 | Eckhardt | 417/48 |
| 3,600,104 | 8/1971 | King | 417/48 |
| 3,885,890 | 5/1975 | Davidson | 417/50 |
| 3,923,426 | 12/1975 | Theeuwes | 417/48 |
| 3,947,334 | 3/1976 | Yamanouchi | 204/140 |
| 4,278,404 | 7/1981 | Avanzini | 417/50 |
| 4,677,038 | 6/1987 | Salomon | 429/11 |
| 4,765,948 | 8/1988 | DeLuca et al. | 376/404 |

OTHER PUBLICATIONS

Kazuo Onda et al., "Cycle and Efficiency of Thermoelectric Energy Conversion and Heat Pump Using Beta-Alumina Solid Electrolyte", Abstract at the 1988 IECEC Meeting.

Primary Examiner—Richard A. Bertsch
Assistant Examiner—David W. Scheuermann
Attorney, Agent, or Firm—Anne D. Daniel; James H. Chafin; William R. Moser

[57] ABSTRACT

An electrical pump for pumping liquid metals to high pressures in high temperature environments without the use of magnets or moving mechanical parts. The pump employs a non-porous solid electrolyte membrane, typically ceramic, specific to the liquid metal to be pumped. A DC voltage is applied across the thickness of the membrane causing ions to form and enter the membrane on the electrically positive surface, with the ions being neutralized on the opposite surface. This action provides pumping of the liquid metal from one side of the non-porous solid electrolyte membrane to the other.

20 Claims, 1 Drawing Sheet

LIQUID METAL ELECTRIC PUMP

ORIGIN OF THE INVENTION

The United States Government has rights in this invention pursuant to Contract No. DE-AC04-76DP00789 between the United States Department of Energy and AT&T Technologies, Inc.

BACKGROUND OF THE INVENTION

This invention relates generally to apparatus for pumping liquid metal and more particularly to an electric pump for pumping liquid metals to high pressures in high temperature environments without the use of magnets or moving mechanical parts.

Pumps for liquid metals are generally known and include not only electromagnetic and mechanical pumps, but also pumps of the type whereby the metal is electrolyzed through a liquid electrolyte barrier.

While electromagnetic pumps include simplicity, the lack of moving parts, and a moderate pressure and temperature capability, mechanical pumps normally have a relatively high pressure capability and high efficiency. However, neither of these types of pumps is capable of both high pressure and high temperature operation. The electromagnetic pump is limited to moderate pressures by the practical magnitudes of electrical current and magnetic-field strength. It is further limited in temperature by the materials used to produce the magnetic field. The magnetic circuit also imposes severe weight penalties. Typical examples of electromagnetic pumps include those shown and described in: U.S. Pat. No. 3,885,890, "Electromagnetic Pumps", Davidson, and U.S. Pat. No. 4,765,948, "Coolant Circulation System For A Liquid Metal Nuclear Reactor", DeLuca et al. Mechanical pumps driven by electric motors are also subject to temperature limits and weight penalties imposed by the motor.

Where liquid metals are electrolyzed through a liquid electrolyte barrier, pumping pressure is limited to the small hydrostatic pressure that naturally occurs across the electrolyte. Examples of the liquid electrolyte type pump include U.S. Pat. No. 3,591,312, Liquid Mercury Flow Control and "Measuring System", Eckhardt and U.S. Pat. No. 3,600,104, "Method And Apparatus For Controlled Pumping Of Liquid Mercury", King.

SUMMARY

It is an object of the present invention, therefore, to provide an improved liquid metal electric pump.

It is another object of the invention to provide a liquid metal electric pump which is capable of both high pressure and high temperature operation.

It is still another object of the invention to provide a liquid metal electric pump which is simple in construction and having no moving mechanical parts.

It is yet another object of the invention to provide a liquid metal pump which requires no magnetic field and can be fabricated entirely of high temperature materials.

Briefly, the foregoing and other objects are achieved by a liquid metal electric pump particularly adapted for high temperature, high pressure applications comprised of a pump body having a liquid inlet port and a liquid outlet port and a non-porous solid electrolyte membrane of a predetermined type for the liquid metal being pumped with the membrane being located in said pump body and separating the inlet and outlet ports. Upon the application of a DC voltage across the non-porous solid electrolyte membrane, ions are formed and enter the membrane at the electrically positive surface of the membrane where they pass therethrough and are neutralized on the opposite or negative surface thereof. This causes a pumping action of the liquid metal to be provided without any moving parts.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are provided only for the purpose of illustrating a preferred embodiment of the invention and are not to be construed as limiting the invention.

DETAILED DESCRIPTION OF THE INVENTION

Figure 1:
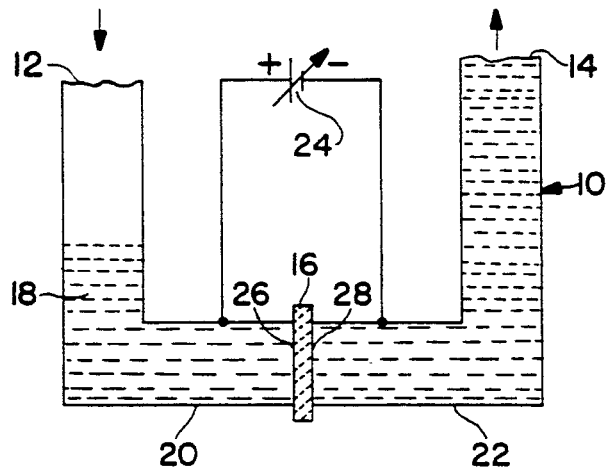
FIG. 1 is a schematic illustration of a basic embodiment of the invention.

Referring now to the drawings wherein like reference numerals refer to like parts throughout, attention is first directed to FIG. 1 where reference numeral 10 denotes a pump body or housing having a liquid metal inlet port 12 and a liquid outlet port 14. The configuration shown in FIG. 1 is a basic representation of the inventive concept where there is located a solid non-porous electrolyte membrane 16 voltage across pump body 10 to separate the inlet port side 20 from the outlet port side 22 of the pump body. Liquid metal 18 is pumped from the inlet port side 20 to the outlet port side 22 when an electric voltage is applied across the electrolyte membrane 16. As shown, a source of variable DC voltage 24 is coupled across the membrane 16 such that the positive polarity terminal is connected to the inlet port side 20, while the negative polarity terminal is connected to the outlet port side 22.

It is significant to note that the principal element in the liquid metal pump shown in FIG. 1 is the solid electrolyte membrane 16 which is non-porous and selected to be specific to the liquid metal that is to be pumped that is, it is of a predetermined type dependent upon the type of liquid metal being pumped. For example, where liquid sodium comprises the liquid metal 18, the membrane 16 is comprised of sodium beta" alumina. This particular material is an excellent sodium-ion conductor while being a very good electric insulator. Accordingly, when an electrical voltage from the source 24 shown in FIG. 1 is applied across the thickness of the membrane 16, sodium-ions will form and pass through the membrane from the electrically positive surface 26, where they exit from the opposite electrically negative surface 28 and are neutralized. Since the membrane 16 is not porous, the movement of ions therethrough occurs as the result of along specific crystal planes as opposed to movement through a porous membrane such as taught by U.S. Pat. No. 3,923,426 where the flow is viscous.

When there is no differential pressure across the membrane 16, the applied voltage thereacross will be substantially equal to the product of the sodium-ion current and the ionic resistance of the membrane. When a differential pressure occurs across the membrane, however, an additional applied voltage from the source 24 will be necessary to maintain the original ion flow. This additional voltage can be approximated by the product of the molar specific volume of the liquid metal at the operating temperature of the pump and the pressure differential across the membrane. The magnitude of the specific volume is such that generally very large pressures can be sustained with relatively small applied voltages. For example, at 880° C., a 9-atmosphere static pressure differential requires the application of only 0.26 millivolts.

For many liquid metals, particularly sodium and potassium, solid electrolyte ceramics are currently known that can survive extremely high temperatures and are thus suitable for use. With respect to mercury, a ceramic solid electrolyte is also contemplated. The solid electrolyte membrane 16 can be sealed to the pump housing or body using refractory metal foil transition sections and active metal brazing techniques as will be disclosed with respect to the embodiments of FIGS. 2 and 3.

Figure 2:
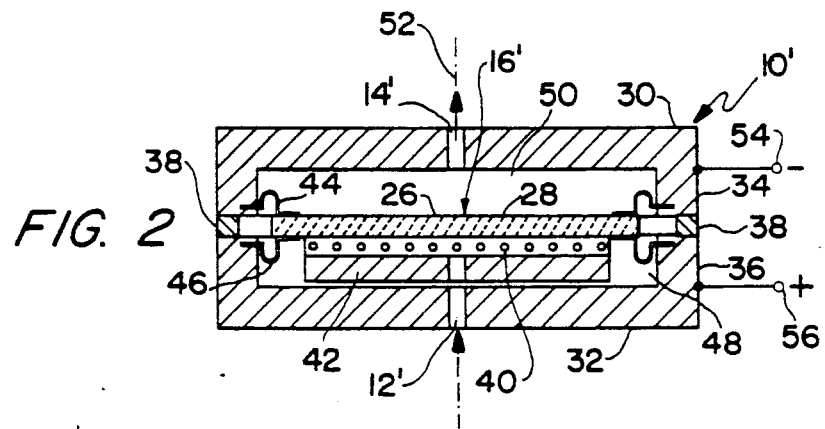
FIG. 2 is a central transverse cross section of a relatively flat compact embodiment of the invention incorporating a flat electrolyte membrane.

Referring now to FIG. 2, shown thereat is a relatively flat compact embodiment wherein the pump housing, identified by reference numeral 10' is generally of a circular cylindrical configuration and includes symmetrical upper and lower half-body members 30 and 32 comprised of metal and mutually facing projecting side rim portions 34 and 36 between which is located a generally annular separator 38 comprised of electric insulating material. Located between the body members 30 and 32, in line with the insulator member 38, is a non-porous solid electrolyte membrane identified by reference numeral 16' which is in the shape of a flat plate or disk. The membrane 16' is supported by a support grid 40 which is attached to a metallic backing member 42. The purpose of the support grid 40 and the backing member 42 is to limit pump pressure induced tensile stresses in the electrolyte membrane 16'.

Further as shown in FIG. 2, the opposite faces 26 and 28 of the electrolyte membrane 16' are mechanically connected to the opposing metal halves 30 and 32 by means of a pair of flexible metal seals 44 and 46, which extend around the rim of the housing portions 34 and 36 to seal off the inner cavity portions 48 and 50 of the pump body 10' which connect to a tubular inlet port 12' and a tubular outlet port 14', respectively, located along the central circular axis 52. A pair of electrical terminals 54 and 56 are additionally shown connected to the metal pump body members 30 and 32 so that a DC supply voltage, not shown, can be coupled thereacross, to provide a pumping action from the inlet port 12' to the outlet port 14' when face 26 of the membrane is of a positive polarity and the face 28 is of a negative polarity.

In many instances, in the embodiments of FIGS. 1 and 2, natural means, such as orientation and gravity, can be used to provide the required liquid metal, which acts as the electrical contact, to the solid electrolyte membrane 16'. Otherwise, porous electrodes and wicking structures can be used on one or both sides of the membrane for these purposes.

Figure 3:
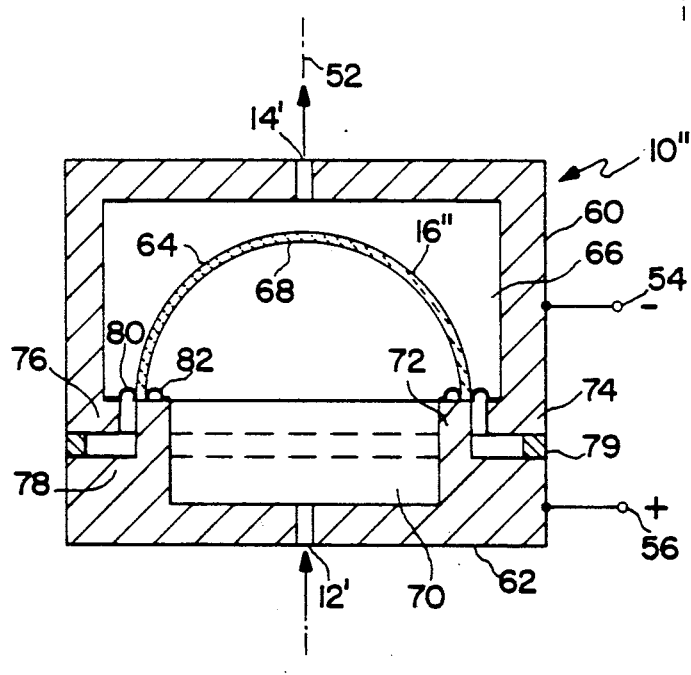
FIG. 3 is a central transverse cross section of an embodiment of the invention having a domed electrolyte membrane.

Referring now to FIG. 3, shown thereat is an embodiment of the invention, which uses a rigid, non-porous solid electrolyte membrane 16" in the shape of a hemispherical dome which is located between upper and lower metallic pump body members 60 and 62. The body members 60 and 62 are generally cylindrical in configuration and have respective inlet and outlet ports 12' and 14' aligned along the central circular axis 52 in the same manner as the embodiment shown in FIG. 2. The upper body member 60, however, is relatively larger in size than the lower body member 62 to accommodate the domed structure of the electrolyte membrane 16" so that its convex surface 64 faces the upper cavity portion 66 while the conical surface 68 faces the lower cavity portion 70 which also includes a portion of the cavity formed by an upwardly projecting rim segment 72 of the lower pump body member 62. The upper body member 60 additionally includes an inwardly projecting rim portion 74 which results in two mutually opposing flat surfaces 76 and 78 being formed for contacting an annular insulator member 79. The semi-circular dome shaped membrane 16" is mounted between the two body members 60 and 62 via a pair of resilient metallic seal elements 80 and 82 which are bonded to the portions 72 and 74 of the lower and upper members 62 and 60, in the same fashion as shown in FIG. 2 and which operate to provide a seal between the upper and lower cavities 66 and 70. DC voltage across surfaces 64 and 68 is provided by voltage terminals 54 and 56 which are connected to the pump body members 60 and 62. Electrical connection from the pump body members 60 and 62 to the surfaces 64 and 68 is accomplished by the liquid metal being pumped.

In both embodiments shown in FIGS. 2 and 3, the operation is the same as that described with respect to FIG. 1 in that application of a DC voltage across the respective non-porous solid electrolyte membranes 16' and 16" causes ions to be formed on the inlet side surface, which is of a positive polarity, and these ions pass through the respective membranes 16' and 16 " where they are neutralized on the opposing negative surface, causing a pumping action of the liquid metal to be provided from the inlet port 12' to the outlet port 14'.

When desirable, the domed membrane structure shown in FIG. 3 can be elongated in the form of a cylindrical tube which would then require the upper and lower body members 60 and 62 to be likewise elongated to accommodate the configuration of the membrane 16". As shown, the embodiment in FIG. 3 includes a high pressure zone which is on the convex side of the electrolyte membrane 16" in cavity 66, as opposed to the cavity 70 so that the electrolyte would be in a compressible stress state.

The pump housings 10' and 10" shown in FIGS. 2 and 3 can be fabricated from a wide variety of high temperature liquid-metal resistant alloys. The same may be said for the membrane support grid and backing elements 40 and 42 shown in the flat plate embodiment of FIG. 2. Because magnetic materials and/or electrical motors or windings are not required, the operating temperature of a device in accordance with the subject invention is limited only by the construction materials utilized. Accordingly, the invention has many diverse uses including commercial, military and space applications where a simple, light, durable, high-temperature and high pressure liquid metal pump is required.

Having thus shown and described what are the presently preferred embodiments of the subject invention, it should be noted that the same has been made by way of illustration. Accordingly, it is intended that the appended claims cover all alterations, modifications, and changes coming within the spirit and scope of the invention.

We claim:

1. A liquid metal pump, comprising:
   a pump body having a liquid inlet port and liquid outlet port;
   a non-porous solid electrolyte membrane of a material compatible with the liquid metal being pumped, located in said pump body and separating said inlet port from said outlet port, and defining an inlet portion and an outlet portion of said pump body, with a pressure differential existing therebetween; and
   a means for applying a DC electrical potential across said membrane, said means comprising the liquid metal being pumped, and thereby forming positive and negative polarity surfaces on said membrane;
   whereby, upon application of said electrical potential across said membrane, ions are formed and enter said membrane at said positive surface, pass through said membrane where said ions exit and are neutralized on said negative surface thereof, causing a pumping action of the liquid metal against the pressure differential between said inlet portion and said outlet portion.

2. The liquid metal pump as defined by claim 1 wherein said liquid metal includes sodium, potassium, and mercury.

3. The liquid metal pump as defined by claim 1 wherein said non-porous solid electrolyte membrane is comprised of ceramic type material.

4. The liquid metal pump as defined by claim 1 wherein said non-porous solid electrolyte membrane is comprised of sodium beta" alumina.

5. The liquid metal pump as defined by claim 1 wherein said non-pours solid electrolyte membrane comprises a generally flat plate or disc.

6. The liquid metal pump as defined by claim 1 wherein said non-porous solid electrolyte membrane comprises an arcuate member.

7. The liquid metal pump as defined by claim 6 wherein said arcuate member comprises a hemispherical dome type member.

8. The liquid metal pump as defined by claim 1 wherein said pump body is comprised of first and second mutually opposing electrically conducting body members separated by an electric insulator member.

9. The liquid metal pump as defined by claim 8 wherein said first and second electrically conductive body members are comprised of metal.

10. The liquid metal pump as defined by claim 8 wherein said means for applying said DC electrical potential across said membrane further comprises a pair of electrical terminals for the connection of a DC voltage source thereto, one of said pair of terminals being electrically connected to said first body member and the other of said terminals being electrically connected to said second body member, and
   additionally including coupling means for electrically connecting said first and second body members, respectively, to said positive and negative polarity surfaces of said nonporous solid electrolyte membrane.

11. The liquid metal pump as defined by claim 10 wherein said coupling means includes means for mechanically isolating said inlet port from said outlet port.

12. The liquid metal pump as defined by claim 11 wherein said means for mechanically isolating said inlet port from said outlet port defines separated input and output cavities within said pump body on opposite sides of said non-porous solid electrolyte membrane.

13. The liquid metal pump as defined by claim 12 wherein said mechanically isolating means comprises at least one resilient metallic seal member connected between one of said first and second body members and one of said positive and negative polarity surfaces.

14. The liquid metal pump as defined by claim 12 wherein said mechanically isolating means comprises a pair of resilient metallic seals respectively connected between said first and second body members and said positive and negative polarity surfaces of said non-porous solid electrolyte membrane.

15. The liquid metal pump as defined by claim 14 wherein said non-porous solid electrolyte membrane comprises a generally flat plate or disc.

16. The liquid metal pump as defined by claim 15 and additionally including a support grid supporting one of said surfaces of said non-porous solid electrolyte membrane.

17. The liquid metal pump as defined by claim 16 and further including a metallic backing member secured to said support grid.

18. The liquid metal pump as defined by claim 14 wherein said non-porous solid electrolyte membrane comprises an arcuate member.

19. The liquid metal pump as defined by claim 18 wherein said arcuate member comprises a hemispherical dome type member.

20. The liquid metal pump as defined by claim 19 wherein said dome type member is of substantially constant thickness.

* * * * *